(12) United States Patent
Ford et al.

(10) Patent No.: US 7,860,026 B2
(45) Date of Patent: Dec. 28, 2010

(54) NETWORK SWITCH DEPLOYMENT

(75) Inventors: Daniel E. Ford, Granite Bay, CA (US); Charles F. Clark, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 595 days.

(21) Appl. No.: 11/714,940

(22) Filed: Mar. 7, 2007

(65) Prior Publication Data

US 2008/0219247 A1 Sep. 11, 2008

(51) Int. Cl.
H04L 12/28 (2006.01)
(52) U.S. Cl. .................................... 370/254
(58) Field of Classification Search ............ None
See application file for complete search history.

(56) References Cited

U.S. PATENT DOCUMENTS

| | | | | |
|---|---|---|---|---|
| 5,432,907 A * | 7/1995 | Picazo et al. | ................ | 709/249 |
| 6,385,648 B1 | 5/2002 | Philippou et al. | | |
| 6,744,773 B1 * | 6/2004 | Harris et al. | ................ | 370/401 |
| 6,850,989 B1 | 2/2005 | Lavian et al. | | |
| 7,283,525 B2 * | 10/2007 | Burgess et al. | .............. | 370/392 |
| 7,289,496 B2 * | 10/2007 | Donoghue et al. | .......... | 370/386 |
| 7,386,876 B2 * | 6/2008 | Kim | ............................... | 726/3 |
| 7,636,774 B2 * | 12/2009 | van Haalen et al. | ......... | 709/221 |
| 2002/0108058 A1 * | 8/2002 | Iwamura | ..................... | 713/201 |
| 2002/0199120 A1 * | 12/2002 | Schmidt | ...................... | 713/201 |
| 2004/0015957 A1 * | 1/2004 | Zara et al. | .................... | 717/174 |
| 2004/0030765 A1 * | 2/2004 | Zilbershtein et al. | ........ | 709/223 |
| 2004/0081104 A1 | 4/2004 | Pan et al. | | |
| 2005/0246431 A1 * | 11/2005 | Spitaels | ...................... | 709/222 |
| 2006/0212547 A1 * | 9/2006 | Deleu et al. | ................. | 709/220 |
| 2006/0274674 A1 * | 12/2006 | Okita et al. | .................. | 370/254 |
| 2007/0214105 A1 * | 9/2007 | Sfarti et al. | ..................... | 707/2 |
| 2007/0268516 A1 * | 11/2007 | Bugwadia et al. | .......... | 358/1.15 |
| 2008/0037418 A1 * | 2/2008 | Cole et al. | ................... | 370/220 |
| 2008/0086768 A1 * | 4/2008 | Mirza-Baig | .................. | 726/13 |
| 2008/0275975 A1 * | 11/2008 | Pandey et al. | ............... | 709/223 |
| 2009/0307478 A1 * | 12/2009 | Gehrmann | ...................... | 713/2 |
| 2010/0040059 A1 * | 2/2010 | Albert Hu | .................... | 370/392 |

\* cited by examiner

Primary Examiner—Chirag G Shah
Assistant Examiner—Amarnauth Persaud

(57) ABSTRACT

Network devices, systems and methods are described that may be used in network switch deployment. One method embodiment includes physically connecting a network switch to a network prior to booting the network switch, booting the network switch into a non-bridging mode, and providing the network switch with a configuration while the switch is in the non-bridging mode.

20 Claims, 4 Drawing Sheets

NETWORK SWITCH DEPLOYMENT

BACKGROUND

Computing systems can include multiple computing devices such as servers, desktop PCs, laptops, and workstations, and peripheral devices, (e.g., printers, facsimile devices, and scanners). In some systems, these network devices can be networked together across a local area network (LAN), wireless LAN, and/or wide area network (WAN) via routers, hubs, switches, and the like to form a computing device network. A LAN and/or WAN uses clients and servers that have network-enabled operating systems such as Windows, Mac, Linux, and Unix.

Any number of network devices, such as those mentioned above, may be included in a network. When such network devices are deployed, e.g., added, to the network, the device typically has to be configured for use in the network environment. This typically means configuring the software, firmware, and other instructions on the device to communicate with the other network devices. Configuring a network device can include providing various device settings, enabling/disabling device features, etc. For instance, in various network devices such as a switch, configuring the switch can include providing configuration factors and/or features including port priority settings, enabling/disabling ports and/or port ranges, providing link speed and/or duplex settings, providing virtual local area network (VLAN) settings, or providing for port mirroring and/or link aggregation, among various other configuration factors and/or features.

In some instances, newly deployed network devices can be configured prior to being physically connected, e.g., physically linked, to the network to avoid network disruptions such as "broadcast storms" which can occur due to loops and/or trunks in the physical setup of the device. Such disruptions associated with loops and/or trunks in the physical setup can be mitigated by providing network devices with configurations that account for the physical setup, e.g., the manner in which the devices are physically connected to other devices of the network.

Many network devices have default configurations, e.g., factory settings, when they are added to a network. In such cases, the default configuration may not match the physical setup of the device, e.g., the default configuration settings may not correspond to how the device is physically linked to other network devices. As such, the device may need to be reconfigured to avoid network disruptions such as those noted above. One option to avoid network disruptions is to boot the device and reconfigure the device prior to physically connecting the device to the network. However, this can require a network administrator or other individual to be physically present at the device location to physically connect the device to the network and other devices thereof.

Another option is to physically connect the device to the network, boot the physically connected device, and then reconfigure the device after the device is booted to change the default configuration. However, reconfiguring the device in this manner can result in the device performing functions such as routing, bridging, and/or switching network traffic according to the default configuration until the device is reconfigured. As noted above, booting a device that is physically connected to the network can create network disruptions when the default configuration does not correspond to the physical setup of the device, and may require the physical presence of a network administrator at the location of the device to ensure proper physical setup of the device.

DETAILED DESCRIPTION

Figure 1:
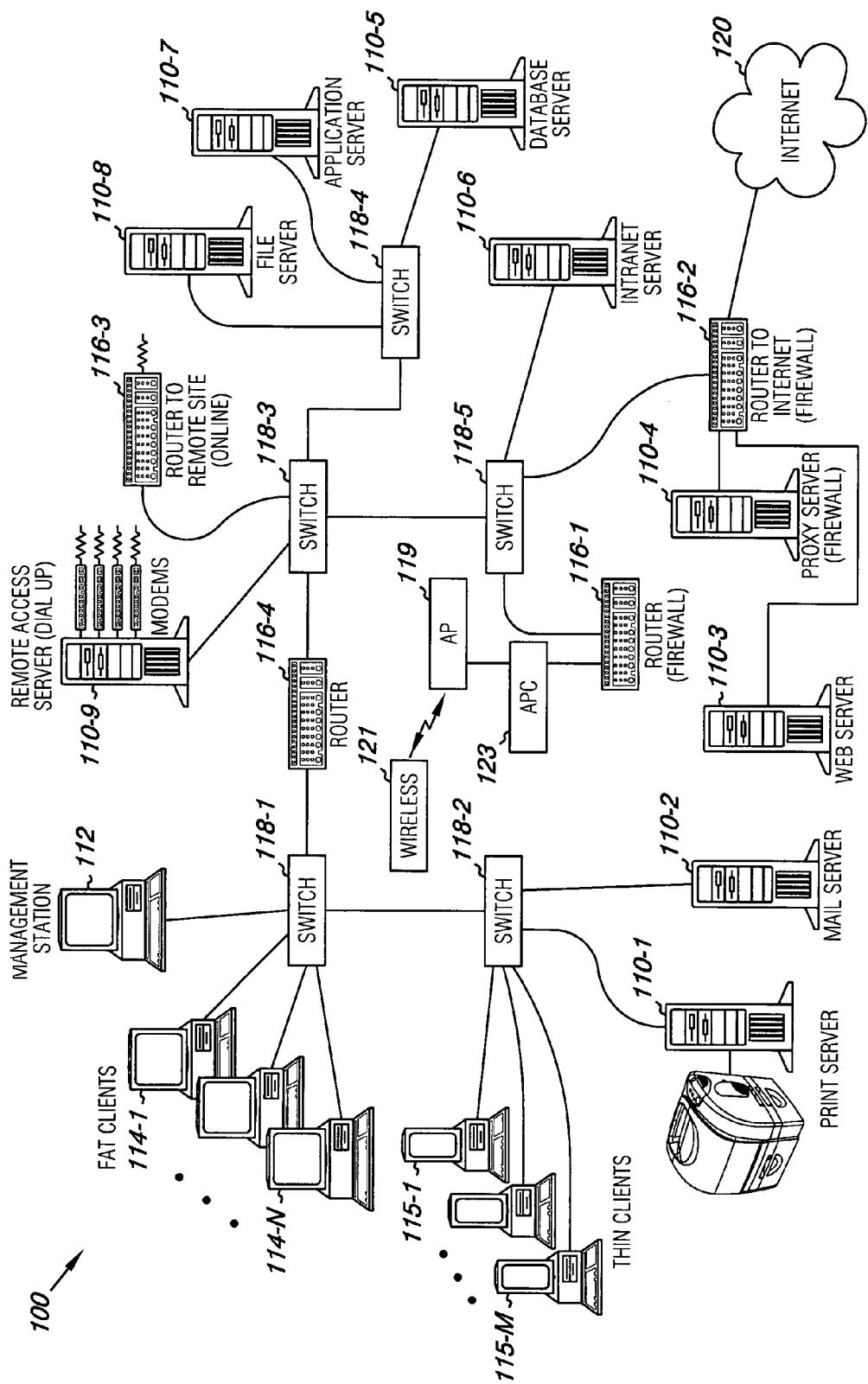
FIG. 1 is an example of a computing device network.

Embodiments of the present invention include various methods, switches, and networks that may be used in network switch deployment. Some embodiments of the present invention may enable a network switch to be physically connected to a network, may allow the network switch to be booted while physically connected to the network, and to allow the network switch to be remotely configured, without regard for the physical setup of the network switch, e.g., the manner in which the network switch is physically connected to the network and/or one or more other network devices.

One embodiment includes physically connecting a network switch to a network prior to booting the network switch, booting the network switch into a non-bridging mode, and providing the network switch with a configuration while the switch is in the non-bridging mode. In some embodiments the method includes implementing the configuration and instructing the network switch to begin operating in a bridging mode.

As used herein, a "non-bridging mode" means a mode in which a network switch is prevented from performing switching functions such as bridging and/or routing, among other switching functions. For example, a non-bridging mode can include a mode in which the switch drops network traffic, e.g., packets, received by the switch if the network traffic includes a destination address other than an address of the switch. That is, network traffic having a destination address other than an address of the switch is not allowed to pass through the switch while the switch is in the non-bridging mode.

In one embodiment, a network switch in accordance with the present invention includes a processor, a memory coupled to the processor, and computer executable instructions stored in the memory and executed by the processor to: boot the switch into a non-bridging mode while the switch is physically connected to a number of network devices; while in the non-bridging mode, drop network traffic received to the switch if the network traffic includes a destination address other than an address of the switch; and change to a switching mode subsequent to receiving a configuration from a configuration device.

In one network embodiment, the network includes a configuration device including a memory coupled to a processor where the memory includes computer executable instructions stored thereon and executed by the processor to configure network switches. In various embodiments, the network includes a first newly deployed switch to the network, the newly deployed switch including physical connections to a number of network devices. As used herein, "newly deployed" refers to a network device that has been added, e.g., physically linked, to a network, but has not been booted, e.g., started or powered up.

In various embodiments, a newly deployed switch can include a processor, a memory coupled to the processor, and computer executable instructions stored in the memory and executable by the processor to boot the newly deployed switch into a non-bridging mode to prevent the newly deployed switch from performing switching functions prior to receiving a configuration from the configuration device. Computer executable instructions stored in the memory of the newly deployed network switch can further be executed to switch from the non-bridging mode to a switching mode in response to receiving the configuration.

Computer executable instructions, e.g., software, can be executed to prevent the newly deployed network switch from initiating communications to network devices such as other switches, routers, and/or servers to which the newly deployed switch is physically connected when the newly deployed switch is booted, e.g., while the network switch is in the non-bridging mode. For example, instructions can be executed to prevent the newly deployed switch, while in the non-bridging mode, from initiating protocols such as a Link Layer Discovery Protocol (LLDP), or other protocol used to communicate with physically connected network devices upon booting.

The embodiments described herein may be performed by software, application modules, application specific integrated circuit (ASIC) logic, and/or executable instructions operable on the systems and devices shown herein or otherwise. "Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

FIG. 1 is an example of a computing device network 100 in which embodiments of the present invention can be implemented. As shown in FIG. 1, a number of devices, e.g., PCs, servers, peripherals, etc., can be networked together via a LAN and/or WAN via routers, hubs, switches, and the like. As used herein a "network device" means a switch, router, hub, bridge, etc., i.e., a device having processor and memory resources and connected to a network 100. Although a switch will often be used in this disclosure as an exemplary network device, those skilled in the art will realize that embodiments of the invention may be implemented with other network devices. As the reader will appreciate, the term network device can also be used to refer to servers, PCs, etc., as illustrated further below.

The embodiment of FIG. 1 illustrates clients and servers in a LAN. The example network of FIG. 1 illustrates a print server 110-1 to handle print jobs for the network 100, a mail server 110-2, a web server 110-3, a proxy server (firewall) 110-4, a database server 110-5, an intranet server 110-6, an application server 110-7, a file server 110-8, a remote access server (dial up) 110-9, and a blade server 140, as described below in connection with FIG. 2. The examples described here do not provide an exhaustive list of servers that may be used in a network.

The embodiment of FIG. 1 further illustrates a network management station 112, e.g., server, PC, and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-4, and 118-5, as the same are known and understood by one of ordinary skill in the art. The term "network" as user herein is not limited to the number and/or type of network devices illustrated in FIG. 1.

Additionally as the reader will appreciate, a number of mobile devices, e.g., wireless device 121, can connect to the network 100 via a wireless air interface (e.g., 802.11) which can provide a signal link 123 between the mobile device 121 and an access point (AP) 119. The AP 119 serves a similar role to the base station in a wireless network, as the same will be known and understood by one of ordinary skill in the art. As shown in FIG. 1, the AP 119 can be linked to an access point controller (APC) 123, as the same will known and understood by one of ordinary skill in the art, which connects the AP 119 over a packet switched signal link, e.g. an Ethernet link, to other network devices, e.g., router 116-1.

Program instructions (e.g., computer executable instructions) can reside on the various network devices. For example, program instructions in the form of firmware and/or software can be resident on the network 100 in the memory of a network management station 112 and/or one or more routers, 116-1, 116-2, 116-3, 116-4, hubs, and/or switches 118-1, 118-2, 118-3, 118-4, 118-5, and can be executable by the processor(s) and/or logic (e.g., hardware in the form of transistor gates) thereon. Also, program instructions can be resident in a number of locations on various network devices in the network 100 as can be employed in a distributed computing network. A "distributed computing network" refers to the use of multiple computing devices, e.g., having processor and memory resources, in a network to execute various roles in executing instructions, e.g., application processing, etc., as described herein.

The network devices, e.g., switches 118-1, 118-2, 118-3, 118-4, 118-5, blade server 140, etc., can include network chips having logic, e.g., application specific integrated circuits (ASICs), and a number of network ports associated with such logic. Embodiments of the various devices in the network are not limited to a number of ports, network chips and/or the type or size of processor or memory resources. As one of ordinary skill in the art will appreciate, each network device in the network 100 can be physically associated with a port of a switch to which it is connected. Information in the form of network packets, e.g., data packets can be passed through the network 100. Users physically connect to the network through ports on the network 100.

Data frames, or packets, can be transferred between network devices by means of a network device's, e.g., switch's, logic link control (LLC)/media access control (MAC) circuitry, or "engines", as associated with ports on a network device. A network switch forwards network packets received from a transmitting network device to a destination network device based on the header information in received network packets. A network device can also forward packets from a given network to other networks through ports on one or more other network devices. As the reader will appreciate an Ethernet network is described herein. However, embodiments are not limited to implementation in an Ethernet network. That is, embodiments can be used in other network types, such as asynchronous transfer mode (ATM) networks, etc. In one embodiment of network 100, at least one of the switches 118-1, 118-2, etc., is a newly deployed switch 318 as described below FIG. 3.

Figure 2:
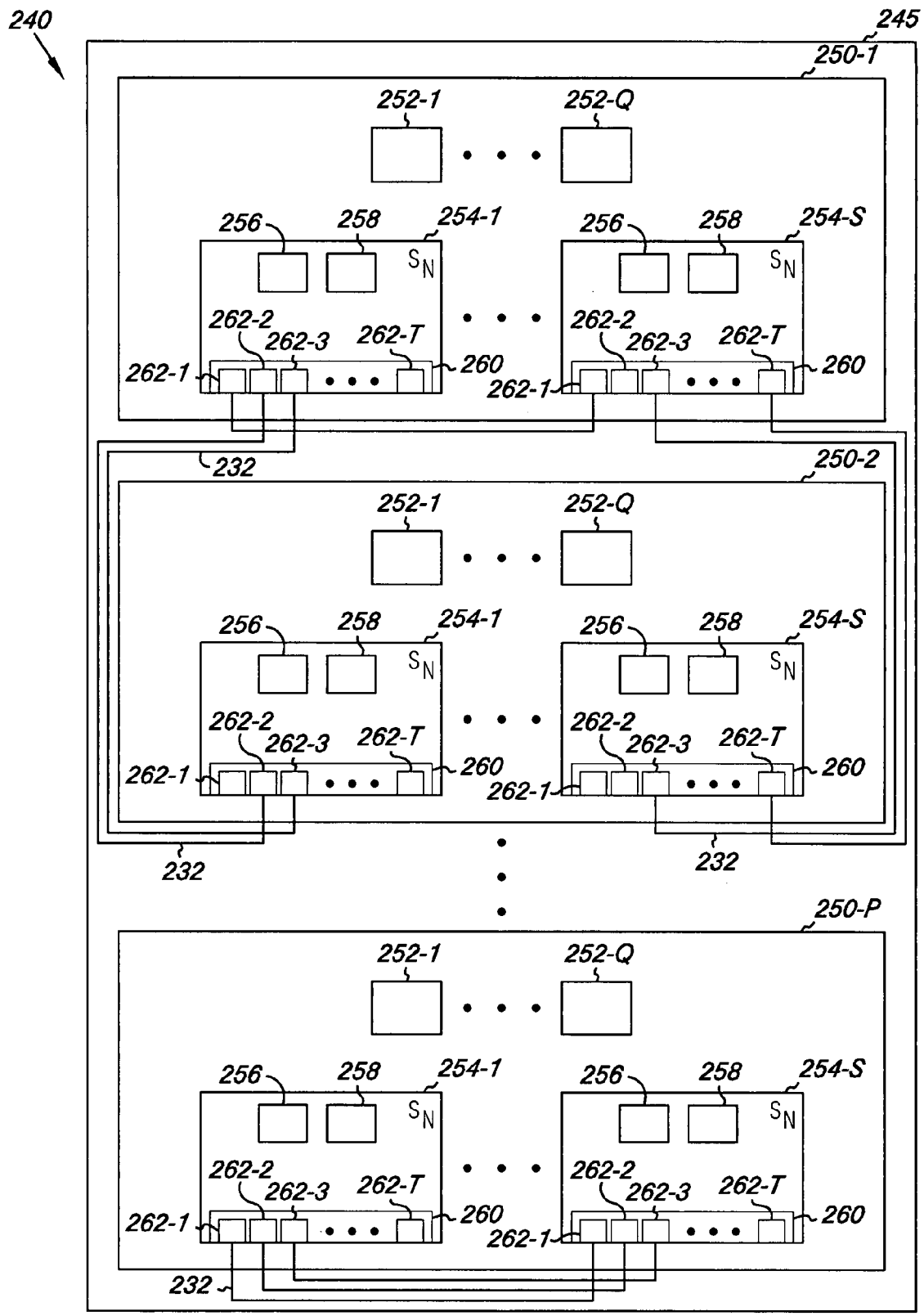
FIG. 2 illustrates a blade server including a number of network switches.

FIG. 2 illustrates a blade server 240 including a number of network switches 254-1, . . . , 254-S in which embodiments can be implemented. Blade server 240 can be a connected to a network, such shown by blade server 140 in FIG. 1. In the embodiment illustrated in FIG. 2, the blade server 240 includes a rack 245 that can physically support a number of chassis 250-1, 250-2, . . . 250-P. Each chassis 250-1, 250-2, . . . 250-P supports a number of server blades 252-1, . . . , 252-Q used to process network information, e.g., IP data packets, received thereto. A "blade server" refers to architecture that houses multiple server modules (e.g., "blades" 252-1, . . . , 252-Q) in one or more chassis 250-1, 250-2, . . . 250-P. Either self-standing or rack 245 mounted, the chassis 250-1, 250-2, . . . 250-P provide(s) the power supply, and each blade 252-1, . . . , 252-Q has its own processor and memory resources. As shown in FIG. 2, each chassis 250-1, 250-2, . . . 250-P can also include a number of network switches 254-1, . . . , 254-S. The server blades 252-1, . . . , 252-Q interface with each other and a network, e.g, network 100 in FIG. 1, through the number of network switches 254-1, . . . , 254-S.

The network switches 254-1, . . . , 254-S can also include processor 256 resources and memory 258 resources. The network switches 254-1, . . . , 254-S include one or more network chip(s) 260, including logic circuitry (hardware) which can execute instructions and each network chip 260 can include a number of network ports, 262-1, 262-2, 262-3, . . . , 262-T to send and receive data packets (network traffic) throughout a network, e.g., network 100 shown in FIG. 1. The logic circuitry of the number of network chips 260 can be in the form of an application specific integrated circuit (ASIC) and include logic to serve as a media access controller (MAC).

As one of ordinary skill in the art will appreciate, network devices such as blade server 240, can arrive at a customer location pre-wired. That is, ports 262-1, 262-2, 262-3, . . . , 262-T of network switches 254-1, . . . , 254-S can be physically linked to each other and/or to ports of other network devices such as server blades 252-1, . . . , 252-Q via physical connectors 262, when the blade server 240 arrives. The physical connectors 262 can be wires, cables, and/or optical fibers, among other suitable physical connectors known in the art.

As described further below in connection with FIGS. 3 and 4, various embodiments of the present invention enable a number of network switches, e.g., network switches 254-1, . . . , 254-S, to be physically connected to each other and to a network, e.g., network 100 in FIG. 1, to be booted while physically connected to the network, and to be remotely configured, without regard for the physical setup of the network switch, e.g., the manner in which the network switches 254-1, . . . , 254-S are physically connected to blade server 240 and/or one or more network devices, e.g., network switches 118-1, 118-2, 118-4, 118-5 as shown in network 100 of FIG. 1.

Figure 3:
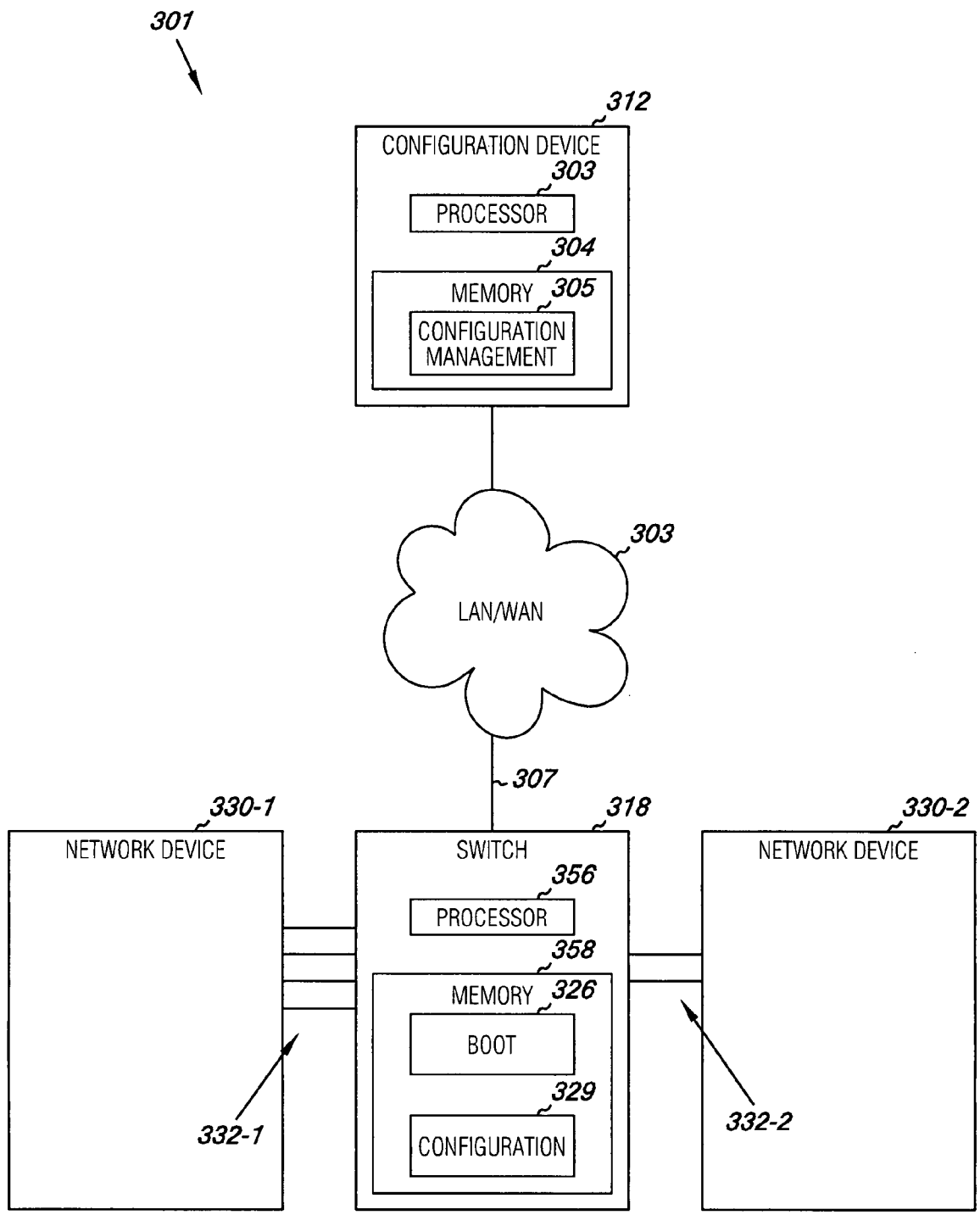
FIG. 3 is a portion of a network including a network switch.

FIG. 3 is a portion 301 of a network, e.g., network 100 shown in FIG. 1, including a network switch 318. In various embodiments, the switch 318 can be a newly deployed switch to the network 301. The switch 318 can be a switch such as switches 118-1, 118-2, 118-4, and 118-5 shown in FIG. 1 and/or switches, 254-1, . . . , 254-S, on a blade server as described in connection with FIG. 2. In the embodiment illustrated in FIG. 3, the network 301 includes a number of devices in communication over a LAN/WAN 303. LAN/NAN 303 can be a network or a portion of a network such as network 100 shown in FIG. 1. In the embodiment illustrated in FIG. 3, the network switch 318 is physically connected, e.g., physically linked, to a first network device 330-1 and a second network device 330-2. The network devices 330-1 and 330-2 can be various devices such as routers, servers, or switches, among other network devices such as those shown in FIGS. 1 and 2. For example, the network devices 330-1 and/or 330-2 can be switches such as switch 318. In some embodiments, the switch 318 and/or devices 330-1 and 330-2 can be part of a blade server, e.g., blade server 140 shown in FIGS. 1 and 2.

In some embodiments, the network switch 318 can be one switch in a stack or rack, e.g., rack 245 shown in FIG. 2, containing multiple switches. That is, network devices 330-1 and/or 330-2 can be network switches. In such embodiments, the network switch 318 can have multiple physical connections to one or more of the other switches, e.g., multiple ports of switch 318 can be physically linked to multiple ports of one or more other switches. In some embodiments, the network switch 318 can be a network switch in a blade server, e.g., blade server 140 shown in FIGS. 1 and 2, that can include multiple network switches and/or server blades.

As noted above, network disruptions due to packet looping and/or improper port trunking can occur when a network device, e.g., switch 118-1 and/or blade server 140 shown in FIG. 1, is newly deployed to a network. As used herein, "packet looping" means repeatedly passing packets back and forth between two switches in a continual loop. The term "trunk" means a communication path, whether logical or physical, between two points, e.g., ports.

Packet looping and improper port trunking can occur when the default configuration of one or more newly deployed switches does not properly account for multiple physical connections among a number of switches or other network devices connected to the newly deployed switch. Additionally, the newly deployed switch may not properly account for the manner in which the other switches and/or other network devices are physically connected to the network upon booting of the newly deployed switch. In such cases, the newly deployed switch and/or rack of a blade server, e.g., 240 in FIG. 2, is referred to as being "misconfigured". In such cases, physically connecting the misconfigured device and/or rack to the network and booting the misconfigured rack can result in a broadcast storm or other network disruption, as the same will be known and understood by one of ordinary skill in the art. As used herein, a "broadcast storm" means repeatedly transmitting packets in a manner disruptive to a network due to a device and/or rack's misconfiguration.

As described further below, various embodiments of the present invention enable a network switch, e.g., 318, to be: physically connected to a network, e.g., 301, booted while physically connected to the network, and configured, without regard for the physical setup of the network switch, e.g., the manner in which the network switch is physically connected to the network and/or one or more devices thereof, e.g., 330-1 and 330-2. As such, various embodiments of the present invention can provide for remote configuration of newly deployed network switches while reducing and/or preventing network disruptions that can be caused by booting newly deployed network switches that are misconfigured.

As shown in the embodiment of FIG. 3, the network switch 318 is also physically connected to a configuration device 312 via LAN/WAN 303. The configuration device 312 can be a network management station, e.g., management station 112 described in connection with FIG. 1, or other device having processor and memory resources that can be used to configure one or more network devices as described herein. In embodiment shown in FIG. 3, the configuration device 312 includes a processor 303, a memory 304, and computer executable instructions 305 stored in memory 304 and executable by processor 303 to perform various configuration functions described herein. For instance, the computer executable instructions 305 can be executed by processor 303 to configure one or more devices such as switch 318, e.g., to provide the one or more devices with various configuration settings. As noted above, configuring a switch, e.g., switch 318, can include providing the switch with configuration settings including port priority settings, link speed and/or duplex settings, virtual local area network (VLAN) settings, among various other configuration settings.

In the embodiment illustrated in FIG. 3, the network switch 318 is shown as being physically connected to configuration device 312 through LAN/WAN 303 via a single connection 307. However, embodiments are not so limited. For instance, switch 318 can be physically linked through LAN/WAN 303 to various other network devices, e.g., configuration device 312 and/or various switches, routers, servers, etc., and can be physically linked to the network 301 and/or devices thereof via multiple connections.

As illustrated in FIG. 3, the configuration device 312 can be remote from the switch 318, e.g., a port of switch 318 may not be directly physically connected via a single physical link to the configuration device 312. Embodiments are not so limited, e.g., a connection 307 can directly physically link switch 318 to configuration device 312 in some embodiments.

Additionally, the network switch 318 is physically connected to other network devices, e.g., 330-1 and 330-2, etc., via connectors 332-1 and 332-2, e.g., physical links such a wiring and cabling. Although switch 318 is shown as being connected to device 330-1 via four physical links 332-1 and to device 330-2 via two physical links 332-2, the reader will appreciate that the network switch 318 can be physically linked to more or fewer network devices and/or via more or fewer physical links than that shown in the embodiment of FIG. 3. Embodiments are not limited to the number of networks and/or network devices to which the network switch 318 can be connected.

For instance, in some embodiments, the network switch 318 can be connected to another network device, e.g., 330-1, via a single physical link, e.g., one port of switch 318 is physically wired or cabled to one port of device 330-2. Additionally, however, switch 318 can be connected to device 330-1 and/or 330-2 via an eight port trunk, e.g., eight ports of switch 318 are physically linked to eight ports of device 330-1 and/or 330-2, e.g., another switch, a server, or a router, among various other network devices.

In various embodiments, configuring a network device, e.g., switch 318, can include sending a set of computer executable instructions, e.g., a set of configuration instructions from the configuration device 312 to the network device, e.g., switch 318, to be stored in memory 358 as a configuration file 329. As one of ordinary skill in the art will appreciate, the instructions in the configuration file 329 can be executed by processor 356 of the switch 318 to apply the configuration settings indicated by the configuration file 329.

In various embodiments of the present invention, deploying a network switch, e.g., switch 318, includes physically connecting the network switch, e.g., 318, to a network, e.g., physically connecting the switch to one or more devices of network 301, prior to booting the network switch. As noted above, booting a network switch while it is physically connected to the network can cause network disruptions which can depend on the configuration and physical setup of the switch. For instance, many network switches include a default configuration and begin switching network traffic, e.g., bridging and/or routing, when they are powered up. Also, many network switches initiate protocols such as LLDP upon startup to communicate with other network devices, e.g., other switches, hubs, routers, and/or servers, to which one or more ports of the network switch is physically linked upon being powered up, e.g., booted. In such cases, network disruptions such as broadcast storms can occur due trunking and/or looping in the physical setup of the switch, which the default configuration may not account for, e.g., the default configuration may not be suitable to eliminate problems such as loops associated with the physical connections of the switch to other network devices.

In various embodiments of the present invention, the network switch, e.g., 318, can include executable instructions, e.g., 326, storable on a memory thereof, e.g., 328, and executed by a processor thereof, e.g., 327, to boot the network switch, e.g., 318, into a non-bridging mode while the switch is physically connected to a number of network devices, e.g., network devices 330-1, 330-2, and 312. In various embodiments, the boot of the network switch 318 is an initial boot of the switch 318, e.g., the first time the switch has been booted since being physically connected to the network and/or to one or more devices thereof.

In various embodiments, while in the non-bridging mode, the network switch, e.g., 318, drops network traffic received to the switch if the network traffic includes a destination address other than an address of the switch, e.g., 318. That is, in various embodiments, network traffic received to the switch 318 having a destination address other than an address of the switch 318 is not allowed to pass through the switch 318. While in the non-bridging mode, the network switch 318 can still send and receive packets using an IP address of the network switch 318. For instance, the network switch can receive an assigned IP address from a network device such as configuration device 312 while the network switch 318 is functioning in the non-bridging mode. In various embodiments, while in the non-bridging mode, the network switch 318 does not initiate protocols such as LLDP with devices physically linked to the switch 318 during the boot process. That is, computer executable instructions 326 can be executed by processor 327 to prevent LLDP packets used to advertise the identity and/or network capabilities of switch 318, from being sent to devices 330-1 and 330-2 physically connected to switch 318 while in the non-bridging mode.

Further, the executable booting instructions 326 can be executed by a processor 356 to instruct the switch to change from a non-bridging mode to a switching mode subsequent to receiving a configuration from a configuration device 312. That is, instructions can be executed to begin performing switching functions such as bridging and/or routing functions after the network switch 318 has been configured. In bridging/switching mode, computer executable instructions are executed such that the network switch, e.g., 318, begins performing switching functions such as initiating protocols, e.g., LLDP, with physically connected network devices and bridging/routing network traffic. In various embodiments, computer executable instructions execute to maintain the network switch 318 in the non-bridging mode until the network switch 318 receives a command, e.g., an operate message, from a network management device such as a configuration device 312 or a network management station such as that described in connection with FIG. 1. In this manner, a booted switch can receive a suitable configuration, e.g., a configuration that corresponds with a physical setup of the switch, and then remain in a non-bridging, e.g., non-switching, mode until an explicit command is received by the switch.

Figure 4:
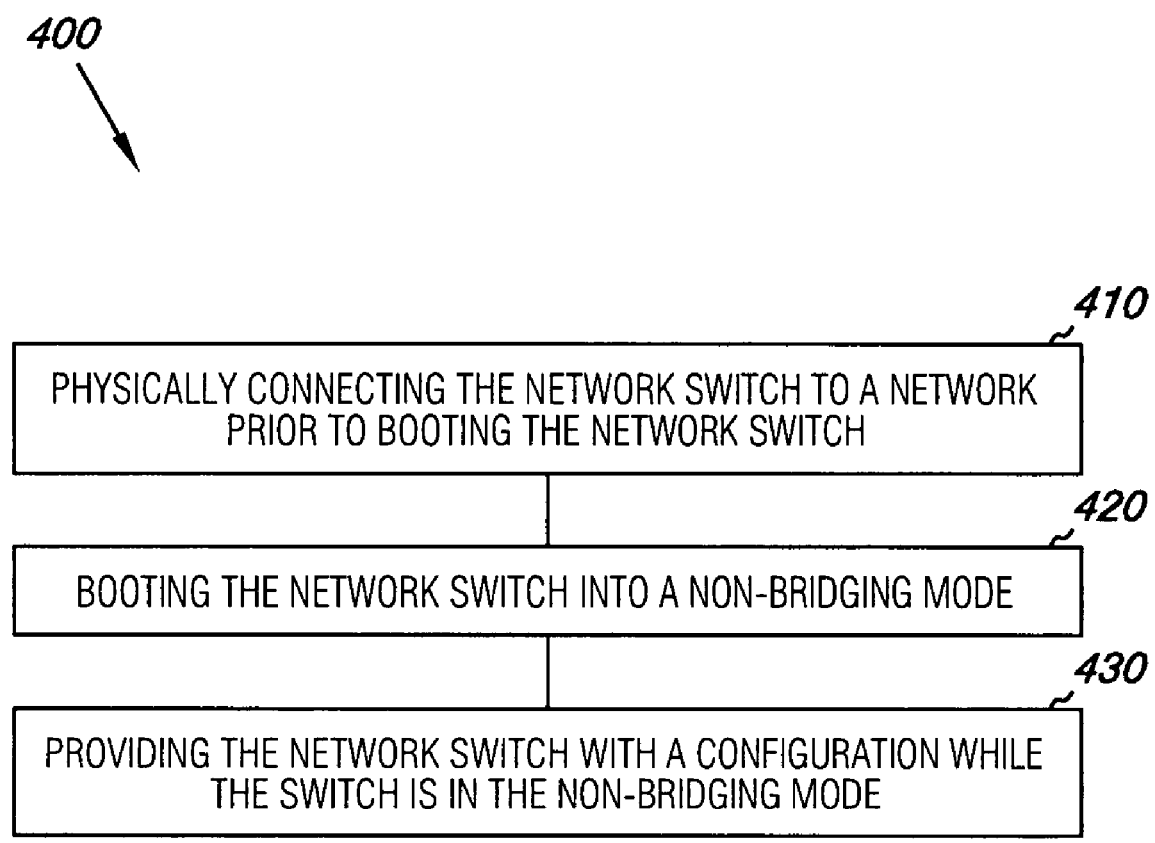
FIG. 4 illustrates an embodiment of a method for deploying a network switch.

FIG. 4 illustrates a method 400 for deploying a network switch according to an embodiment of the present invention. Unless explicitly stated, the method embodiments described herein are not constrained to a particular order or sequence. Additionally, some of the described method embodiments can occur or be performed at the same point in time.

As illustrated at block 410, the method 400 includes physically connecting a network switch to a network prior to booting the network switch. The network switch can be a newly deployed network switch. As described above in connection with FIG. 3, the network switch can be physically connected to the network and/or various other network devices in a variety of manners. For example, according to various embodiments, a first network switch can be connected to one or more other network switches. In such embodiments a first port and a second port of the first network switch can be physically connected to a first port and a second port of one or more other switches. That is, in various embodiments of the present invention, a network switch can include multiple connections to one or more network devices, e.g., switches, routers, hubs, servers, and the like.

In some embodiments, the network switch is one of a number of switches in a rack. The rack can be a newly deployed rack and can include a number of newly deployed network switches. The network switch can also be a network switch of a blade server such as blade server 140/240 described in FIGS. 1 and 2. The network switch can include multiple physical connections to other network switches and/or servers in the rack, e.g. multiple physical connections as shown in the blade server 140 of FIGS. 1 and 2 and/or in network switch 318 shown in FIG. 3. In various embodiments, the switches in the rack are preconfigured switches that are physically linked together prior to installation of the rack at a customer location.

In various embodiments, booting the network switch includes an initial booting of a network switch newly deployed to the network. For instance, the boot of the newly deployed network switch can be a first boot after the switch is physically connected to the number of network devices.

As illustrated at block 420, the method 400 includes booting the network switch into a non-bridging mode. The network switch can include a processor, a memory coupled to the processor, and computer executable instructions stored in the memory and executable by the processor to boot the switch into the non-bridging mode to prevent the switch from performing switching functions such as bridging and routing network traffic prior to receiving a configuration from a configuration device, e.g., a network manager station or configuration device such as device 312 shown in FIG. 3. In various embodiments, the non-bridging mode is a mode in which network traffic having a destination address other than an address of the switch is not allowed to pass through the switch.

Also, in various embodiments, the non-bridging mode is a mode in which communications from the network switch to other network devices, physically connected thereto, are restricted. For instance, communications such as LLDP packets among other packet protocols, which are often initiated by network switches when powered up, are prevented from being initiated during the non-bridging mode according to embodiments of the present invention.

In various embodiments, instructions can be executed to implement the configuration and instruct the network switch to begin operating in a switching mode, e.g., bridging mode. For example, instructions can be executed to maintain the network switch in the non-bridging mode until the network switch is instructed to begin operating as a switch, e.g., to begin performing switching functions such as bridging network traffic received to the switch and/or initiating traffic, e.g., LLDP packets, from the switch. For instance, the network switch can receive an operate message from a network management device. The operate message can be a command sent from a configuration device, e.g., device 312 shown in FIG. 3, instructing the network switch to begin performing switching functions according to the configuration of the network switch.

As illustrated at block 430, the method 400 includes providing the network switch with a configuration while the switch is in the non-bridging mode. Providing the network switch with a configuration can include sending a set of computer executable configuration instructions to the switch from a configuration device such as a network management station or other device capable of configuring a network switch. That is, the configuration device can include a memory coupled to a processor, the memory including computer executable instructions stored thereon and executed by the processor to configure network switches. According to embodiments, the configuration device can be remote from the network switch, e.g., configuration device 312 shown in FIG. 3 is remote from network switch 318.

The configuration instructions received by the network switch can include a configuration file and/or other computer executable instructions that can be stored on a memory of the network switch and executed by a processor thereof to perform various functions including applying and/or altering configuration settings to the network switch. The configuration settings can include port priority settings, link speed and/or duplex settings, or virtual local area network (VLAN) settings, among other settings. For example the configuration instructions stored on the memory of the network switch can be executed to enable/disable ports and/or port ranges and/or to provide for features such as port mirroring and/or link aggregation, to name a few. In various embodiments, the configuration settings provided to the network switch from the configuration device correspond to a manner in which the network switch is physically connected to a number of network devices.

Another embodiment of the method for deploying a network switch includes the process described above with reference to FIG. 4 and further includes implementing the configuration and instructing the network switch to begin operating in a bridging mode. As discussed herein, in various embodiments, the network switch can include computer executable instructions stored on a memory thereof that can be executed to change from the non-bridging mode to a switching mode subsequent to receiving the configuration from the configuration device. That is, computer executable instructions can be executed such that the network switch begins initiating network traffic protocols and bridging/routing network traffic according to the received configuration. In some embodiments, the computer executable instructions can be executed to change from the non-bridging mode to the switching mode in response to a command received from the configuration device.

It is to be understood that the above description has been made in an illustrative fashion, and not a restrictive one.

Although particular embodiments have been illustrated and described herein, those of ordinary skill in the art will appreciate that other component arrangements and device logic can be substituted for the particular embodiments shown. This claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed:

1. A method for deploying a network switch, comprising:
   physically connecting the network switch to a network prior to booting the network switch;
   booting the network switch into a non-bridging mode in which network traffic having a destination address other than an address of the switch is not allowed to pass through the switch; and
   providing the network switch with a configuration while the switch is in the non-bridging mode.

2. A method as recited in claim 1 wherein the method includes implementing the configuration and instructing the network switch to begin operating in a bridging mode.

3. A method as recited in claim 1 wherein booting the network switch into the non-bridging mode includes booting the switch into a mode in which at least some network traffic having a destination address of the switch is not discarded.

4. A method as recited in claim 1 wherein providing the network switch with the configuration includes sending a set of computer executable configuration instructions to the switch.

5. A method as recited in claim 4 wherein the method includes sending the set of computer executable configuration instructions from a network management station.

6. A method as recited in claim 4 wherein the method includes:
   applying the configuration by executing the set of configuration instructions; and
   switching the network switch to a bridging mode subsequent to applying the configuration.

7. A method as recited in claim 1 wherein the method includes maintaining the network switch in the non-bridging mode until the network switch receives an operate message from a network management device.

8. A method as recited in claim 1 wherein booting the network switch includes an initial booting of a network switch newly deployed to the network.

9. A method as recited in claim 1 wherein providing the network switch with the configuration includes providing the network switch with configuration settings that corresponds to a manner in which the network switch is physically connected to a number of network devices.

10. A network switch comprising:
    a processor;
    a memory coupled to the processor; and
    computer-executable instructions stored in the memory and executed by the processor to:
      boot the switch into a non-bridging mode while the switch is physically connected to a number of network devices;
      while in the non-bridging mode, drop network traffic received to the switch if the network traffic includes a destination address other than an address of the switch; and
      change to a switching mode subsequent to receiving a configuration from a configuration device.

11. A switch as recited in claim 10 wherein the computer-executable instructions execute to perform, during the switching mode, a switching function selected from the group of:
    a routing function; and
    a bridging function.

12. A switch as recited in claim 10 wherein the computer-executable instructions execute to change from the non-bridging mode to the switching mode in response to a command received from the configuration device.

13. The switch of claim 10, wherein a first port and a second port of the network switch are physically connected to a first port and a second port of another network switch prior to the boot.

14. A switch as recited in claim 10 wherein the computer-executable instructions execute to prevent, while the network switch is in the non-bridging mode, the network switch from initiating communications with one or more switches to which the network switch is physically connected.

15. A switch as recited in claim 10 wherein the boot of the newly deployed network switch is a first boot after the switch is physically connected to the number of network devices.

16. A network comprising:
    a configuration device including a memory coupled to a processor, the memory including computer-executable instructions stored thereon and executed by the processor to configure network switches; and
    a first newly deployed switch to the network, the newly deployed switch including physical connections to a number of network devices, the newly deployed switch including:
      a processor;
      a memory coupled to the processor; and
      computer-executable instructions stored in the memory and executable by the processor to:
        boot the newly deployed switch into a non-bridging mode in which network traffic having a destination address other than an address of the switch is not allowed to pass through the switch; and
        switch from the non-bridging mode to a switching mode in response to receiving the configuration.

17. A network as recited in claim 16 wherein the configuration device is a network management station remote from the newly deployed switch.

18. A network as recited in claim 16 wherein the first newly deployed network switch is one of a number of switches in a rack, and wherein the first newly deployed network switch includes multiple physical connections to a second network switch in the rack.

19. A network as recited in claim 18 wherein the switches in the rack are preconfigured switches and are physically linked together prior to installation of the rack at a customer location.

20. A network as recited in claim 16 wherein the number of network devices includes at least one newly deployed network device to the network, and wherein the newly deployed network switch includes multiple physical connections to the at least one newly deployed network device.

* * * * *